(12) United States Patent
Gustafson et al.

(10) Patent No.: US 6,391,101 B2
(45) Date of Patent: *May 21, 2002

(54) SEPARATOR WITH MULTIPLE FUNCTION VANES FOR A VACUUM CLEANER APPARATUS

(75) Inventors: Eric Lee Gustafson, Cadillac; Jeffrey Robert Kassien, Tustin, both of MI (US)

(73) Assignee: Rexair, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/910,573

(22) Filed: Jul. 20, 2001

Related U.S. Application Data

(63) Continuation of application No. 09/552,275, filed on Apr. 19, 2000, now Pat. No. 6,306,199.

(51) Int. Cl.[7] .............................................. B01D 47/02
(52) U.S. Cl. .......................... 96/333; 15/353; 96/337; 96/359; 55/DIG. 3
(58) Field of Search ....................... 15/353; 55/DIG. 3, 55/400, 401, 406, 408; 95/226, 270; 96/359, 351, 353, 334, 342, 340, 348, 329, 337, 338, 339

(56) References Cited

U.S. PATENT DOCUMENTS

| | | |
|---|---|---|
| 2,102,353 A | 12/1937 | Brock |
| 2,114,780 A | 4/1938 | Juelson |
| 2,184,731 A | 12/1939 | Brewer |
| 2,189,021 A | 2/1940 | Schury |
| 2,221,572 A | 11/1940 | Brock et al. |
| 2,945,553 A | 7/1960 | Brock |
| 4,693,734 A | 9/1987 | Erickson, Jr. ................. 55/248 |
| 4,851,017 A | 7/1989 | Erickson et al. ............... 55/256 |
| 5,030,257 A | 7/1991 | Kasper et al. |
| 5,090,974 A | 2/1992 | Kasper et al. .................. 55/95 |
| 5,096,475 A | 3/1992 | Kasper et al. |
| 5,199,963 A | 4/1993 | Scarp .......................... 55/186 |
| 5,902,386 A * | 5/1999 | Gustafson et al. |
| 6,162,287 A | 12/2000 | Rohn et al. ................... 96/333 |
| 6,174,350 B1 | 1/2001 | Rohn et al. ................... 95/218 |
| 6,224,656 B1 | 5/2001 | Kawamoto ................... 96/331 |

* cited by examiner

Primary Examiner—Duane S. Smith
(74) Attorney, Agent, or Firm—Howard & Howard

(57) ABSTRACT

A vacuum cleaner apparatus includes a housing, a motor disposed within the housing and having an output shaft, and a fan coupled to the output shaft for generating a vacuum airflow through an air intake port in the housing. A separator is operably coupled to the output shaft for separating dust and dirt particulates entrained in air ingested through the intake port. The separator has a body that defines a longitudinal axis of rotation and the motor drives the separator to rotate about the axis. The body includes a plurality of longitudinally extending vanes with each vane presenting a curved flow surface for increased particulate separation as the body rotates about the axis. The longitudinally extending vanes include beveled lower ends that reduce foaming. The separator also includes a plurality of secondary particle impacting vanes positioned in the bottom of the separator for trapping particulates within said separator.

21 Claims, 4 Drawing Sheets

SEPARATOR WITH MULTIPLE FUNCTION VANES FOR A VACUUM CLEANER APPARATUS

This application is a continuation application of assignee's application Ser. No. 09/552,275, "Separator with Multiple Function Vanes for a Vacuum Cleaner Apparatus", filed Apr. 19, 2000, now U.S. Pat. No. 6,306,199 issued Oct. 23, 2001.

BACKGROUND OF THE INVENTION

1. Field of the Invention

This invention relates to a vacuum cleaner of the type for household use.

2. Description of the Prior Art

Vacuum cleaners of various designs are used in residential and commercial applications for cleaning. These vacuum cleaners create a suction airflow that picks up dirt and dust particulates from a surface that is to be cleaned. The vacuum cleaner separates these particulates from the ingested air for later disposal.

One type of vacuum cleaner design is a canister style vacuum cleaner with a water bath. Water bath vacuum cleaners typically include a main housing with a removably attached water bath pan. The ingested particulates are directed into a water bath that absorbs most of the particulates. The particulates are directed through an inlet in the main housing of the vacuum cleaner to an intake opening in the water bath pan. The primary advantage of the water bath filter is that vacuum efficiency is not compromised as more dirt and dust is accumulated in the water bath, and no further filtering is viewed as necessary. The dust and dirt are trapped in the water bath as the incoming air is directed into the water bath pan and circulated within. Traditional filtering media allow the flow of air through the filtering media to be impeded by the accumulation of the dirt and dust that has collected thereon. However, just as traditional filter media will allow very tiny microscopic particles to escape capture, the water bath may also fail to capture all of the very small or microscopic particles that are light enough to remain suspended in the air as the air is circulated in the water bath pan.

The water bath vacuum cleaners typically include a separator assembly that is used to further separate particulates from the ingested air that escapes entrapment within the water bath. Additionally, the separator can separate particulates that are entrained within water droplets that are ingested into the separator. The separator provides additional filtration by centrifugation. The process of centrifugation involves apply a centrifugal force to an air mass having particulates. The air mass is drawn into an annular chamber via intake openings in the separator. The chamber spins at a high angular velocity causing the particulates within the air mass to be forced outwardly toward the outer wall of the chamber. The particulates are then exhausted through upwardly through the open end of the separator.

While the separator assemblies discussed above perform satisfactorily, it is a principal object of the present invention to provide an improved separator for a vacuum cleaner that more effectively separates fine dust and dirt particulates from the intake air.

It is a further object of the present invention to provide an improved separator that reduces foaming caused by the addition of cleaning chemicals and fragrances to the water bath.

It is a further object of the present invention to increase airflow into the separator such that separation can be increased more efficiently.

It is a further object of the present invention to provide an improved separator that more effectively removes particulates from water droplets ingested into the separator.

SUMMARY OF THE INVENTION AND ADVANTAGES

The above objects of the present invention are provided by a new and improved separator assembly for a vacuum cleaner that utilizes curved longitudinal vanes to improve separation of particulates from the air stream and utilizes a plurality of secondary particle impacting vanes to trap particulates within the separator.

In a preferred embodiment, the vacuum cleaner comprises a housing, a motor disposed within the housing and having an output shaft, and a fan coupled to the output shaft. The fan generates a vacuum airflow through an air intake port in the housing. A separator is operably coupled to the output shaft and is used to separate dust and dirt particulates entrained in air ingested through the intake port. The separator has a body that defines a longitudinal axis of rotation and the motor drives the separator to rotate about the axis. The body includes an upper lip and a bottom portion interconnected by a plurality of longitudinally extending vanes. Each vane has a first end connected to the upper lip and a second end connected to the bottom portion wherein the first end is positioned above the second end within a vertical plane that incorporates the vane and the longitudinal axis of rotation. The first and second ends are interconnected by a curved flow surface for increased particulate separation as the body rotates about the axis of rotation.

In one preferred embodiment, the longitudinally extending vanes are used to increase airflow into the separator by having a curved flow surface that curves about an axis that extends along the length of each of the vanes. Preferably, the longitudinally extending vanes are tapered with respect to the axis of rotation.

In another preferred embodiment, the longitudinal curved vanes include means to reduce foaming caused by the addition of chemicals to the water bath.

In one embodiment, the separator includes secondary particle impacting vanes that trap particulates within the separator by having a curved flow surface that extends along the length of the vanes. The secondary particle impacting vanes are orientated transversely with respect to the longitudinally extending vanes.

Accordingly, the present invention will utilize the separator to have significantly improved separation of small particle sizes. The secondary particle impacting vanes provide a means for trapping particulates that enter the inner section of the separator. The longitudinally extending curved vanes increase airflow into the separator as a result of lower aerodynamic losses. The cross-sectional shape of the longitudinally extending curved vanes allows the vanes to be nested with respect to each other to increase the overall number of vanes in the separator, which increases overall separation efficiency. The improved separator design utilizes longitudinal curved vanes and secondary particle impacting vanes to improve separation of particulates, which thereby increases the overall efficiency of the vacuum cleaner.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
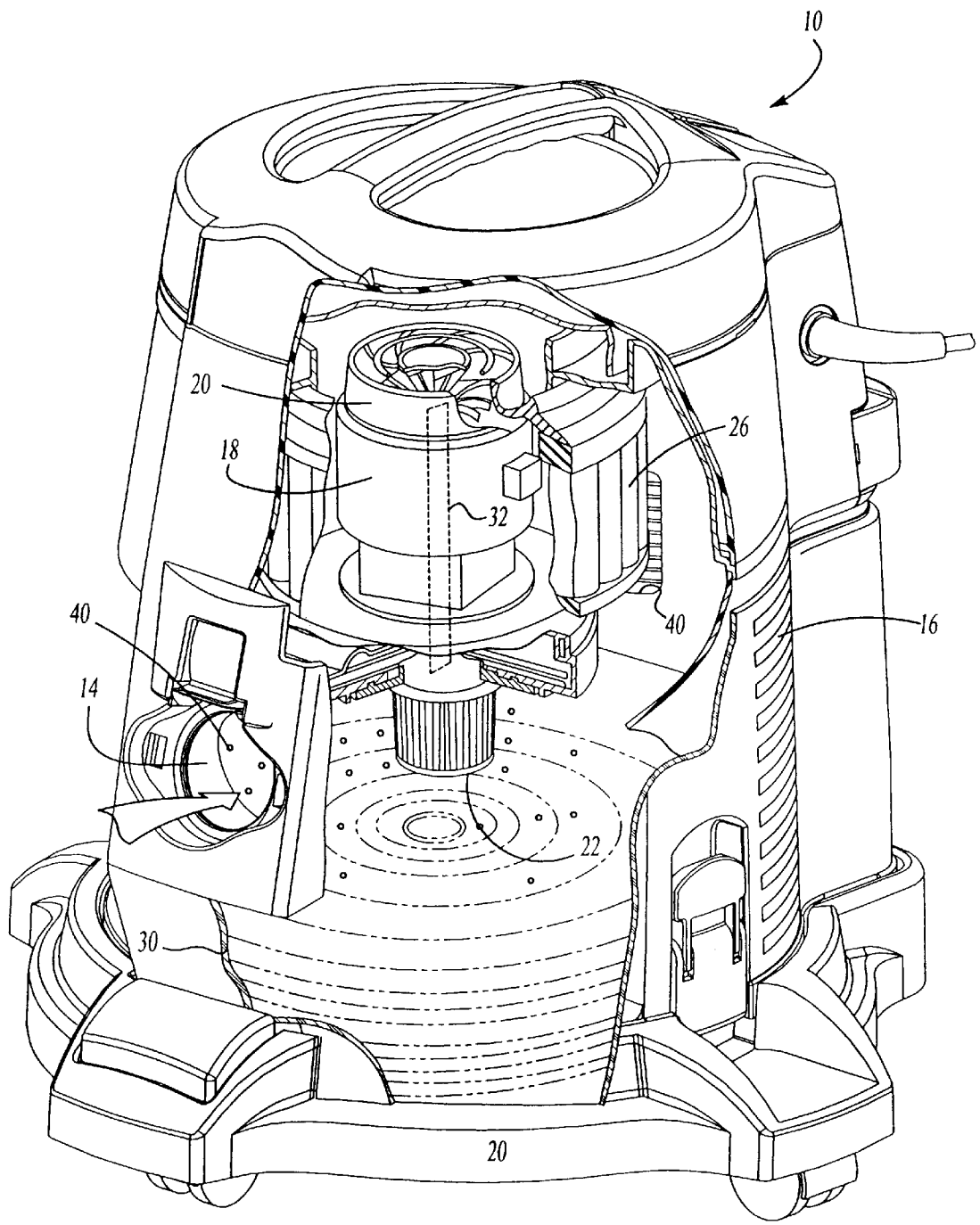
FIG. 1 is a perspective view of the vacuum cleaner assembly, partially broken away and in cross section.

Referring to the Figures, wherein like numerals indicate like or corresponding parts throughout the several views a vacuum cleaner assembly is generally shown at 10. The vacuum cleaner assembly 10 includes a main housing 12 having an intake inlet 14 and an outlet 16. A motor 18 is mounted within the main housing 12 between the inlet 14 and the outlet 16 for providing motive force to a cooling fan 20, a separator assembly 22, and a blower 24. The cooling fan 20 is mounted within the main housing 12 above the motor 18 to circulate cooling air around the motor 18. A cooling air filter 26 surrounds the motor 18 to direct the cooling air around the motor 18 and to filter the cooling air prior to being exhausted. The blower 24 is mounted within the main housing 12 below the motor 18 for drawing air into the inlet 14 and exhausting air outwardly through the outlet 16. The separator 22 is mounted below the blower 24 for circulating the air and a water bath 28 within a water bath pan 30 and providing, in combination with the water bath 28, a primary filter for filtering particulates 40 from the air prior to exhausting the air outwardly through the outlet 16. Vacuum cleaners using a water bath filter are known to those skilled in the art as described in U.S. Pat. No. 5,096,475, which is hereby incorporated by reference to this specification.

As shown schematically in FIG. 1, the motor 18 has an output shaft 32 where the fan 20 is coupled to the output shaft 32 to generate a vacuum airflow through the intake 14 in the housing 12. The separator 22 is operably coupled to the output shaft 32 or separating dust and dirt particulates entrained in air ingested through the intake 14.

Figure 2:
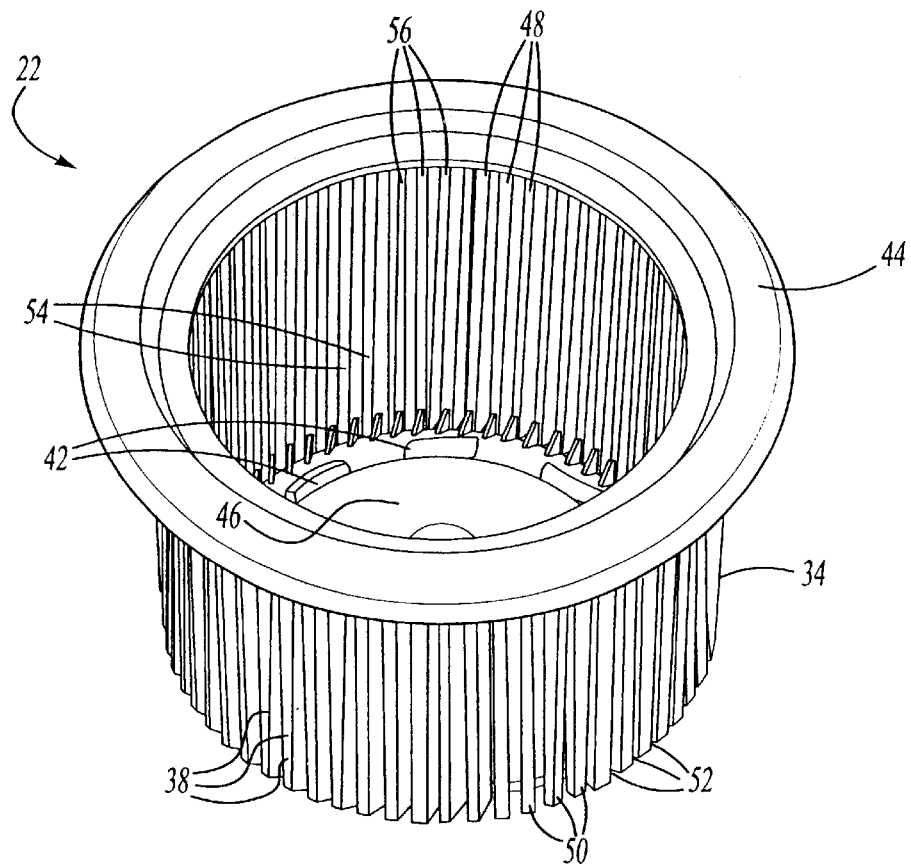
FIG. 2 is an elevational perspective view of the separator shown in FIG. 1 showing the secondary particle impacting vanes.
Figure 3:
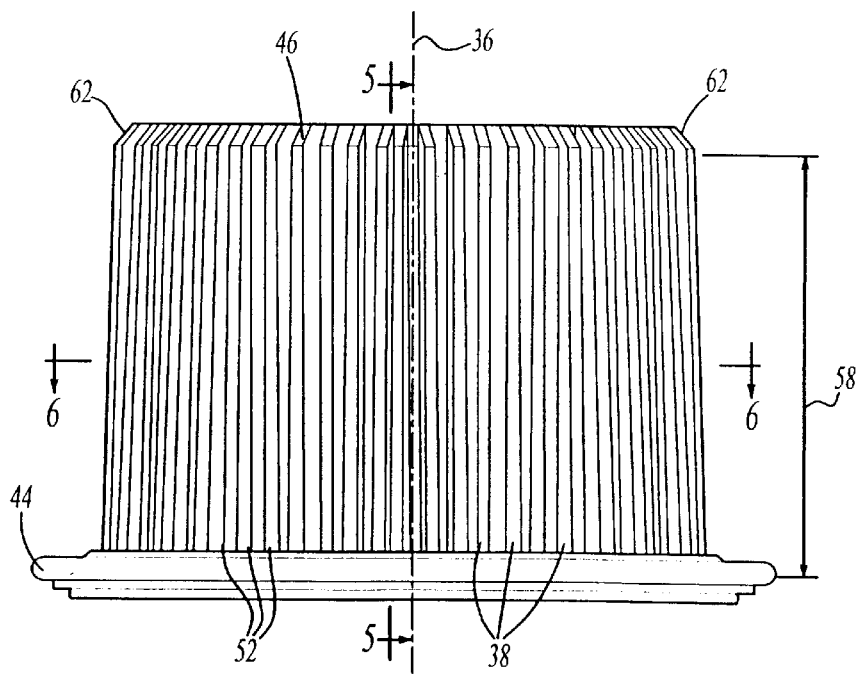
FIG. 3 is a side view of the separator of FIG. 2 showing the angled bottom edge portions.

As shown in FIG. 2, the separator assembly 22 includes an annular cup-shape body or separator housing 34 that defines a longitudinal axis of rotation 36 (FIG. 3). The motor 18 drives the separator body 34 to rotate about the axis 36. The body 34 includes a plurality of vanes 38 presenting a curved flow surface for increased particulate 40 separation and reductions in aerodynamic losses as the body 34 rotates about the axis 36. The vanes for 38 extend longitudinally with respect to the body 34 and are generally tapered relative to the axis of rotation 36. The curved flow surface extends along the length of each of the vanes 38. The taper is shown most clearly in FIGS. 3 and 5 where the upper diameter of the separator 22 is shown as having a larger diameter than the lower portion of the separator 22. In the preferred embodiment, the separator body 34 is radially outwardly tapered, however, radial inward taper could also be used.

Secondary particle impacting vanes 42 are also formed within the separator body 34. The secondary particle impacting vanes 42 are laterally extending vanes that trap particulates 40 within the separator 22. The curved flow surface of the secondary particle impacting vanes 42 extends along the length of the vanes 42.

Figure 4:
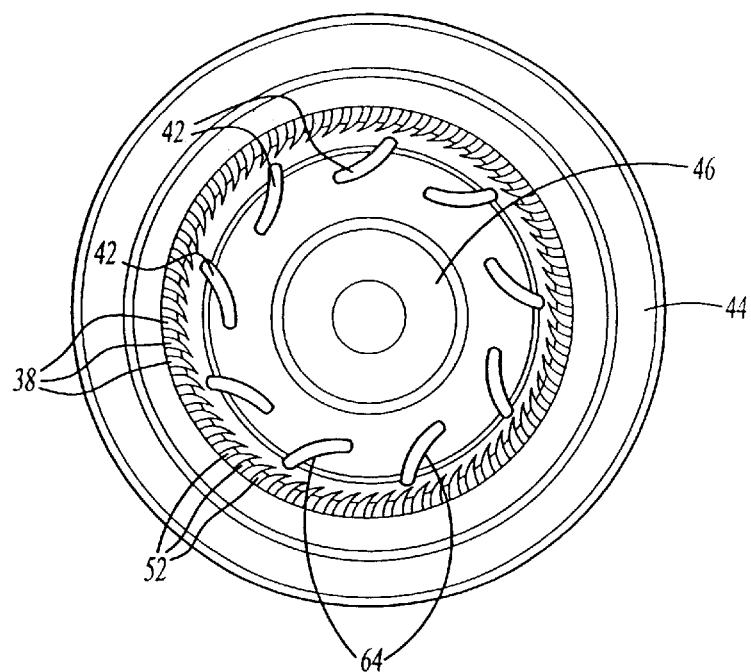
FIG. 4 is an overhead view of the separator of FIG. 2 showing the secondary particle impacting vanes.

The separator 22 includes an upper lip 44 and a bottom portion 46. The lip 44 extends transversely with respect to the axis 36. The longitudinally extending vanes 38 each having one end 48 connected to the lip 44 and a portion of an opposite end 50 connected to the bottom portion 46 to form a cup-shaped separator 22. The secondary particle impacting vanes 42 are formed in the bottom portion 46 and are positioned about the circumference of the bottom portion 46, shown in FIG. 4. The secondary particle impacting vanes 42 are preferably integrally formed in the bottom portion 46 and extend upwardly from the bottom portion 46 toward the lip 44. Thus, the secondary particle impacting vanes 42 are formed as raised baffles that create retaining or trapping means within the separator body 34 to collect particulates 40 within the separator 22.

The curved flow surface of the secondary particle impacting vanes 42 is preferably defined by an arc on a side surface 64 extending along the length of the vanes 42. Preferably, the secondary particle impacting vanes 42 are positioned such that the curved flow surface along the length of the vanes 42 also extends generally about the circumference of the bottom portion 46. However, the secondary particle impacting vanes 42 could also be orientated such that they extend out radially from the center of the bottom portion 46.

The fluid, such as water droplets or air having dirt or dust particulates 40 entrained within, is drawn into the separator body 34 as the body 34 rotates about the axis 36. A plurality longitudinal slots or openings 52 are formed between each of the longitudinally extending vanes 38. The fluid and particulates 40 are drawn into the exterior of the separator 22 via an intake and only minute particulates are expelled upwardly from the separator 22 via an exhaust through an open end of the cup-shaped separator 22. The intake occurs through the slots 52 and the exhaust occurs through the upper open end. As the particulates 40 are drawn in, separator body 34, which rotates at a high angular velocity, applies a centrifugal force to the particulates 40 and the air/water. The particulates 40 are forced outwardly against the outer surfaces of the body 34 where they can be expelled back into the water bath 28 below. The cleaned air is then exhausted from the separator and out through the outlet 16.

As discussed above, the separator 22 includes upper lip 44 and bottom portion 46 that are interconnected by longitudinally extending vanes 38. Each vane 38 has a first end 48 connected to the lip 44 and a portion of a second end 50 connected to the bottom portion 46 to form a cup-shaped separator 22. As shown in FIG. 3, the first end 48 is positioned above the second end 50 within a vertical plane that incorporates the respective vane 38 and the longitudinal axis of rotation 36.

Figure 6:
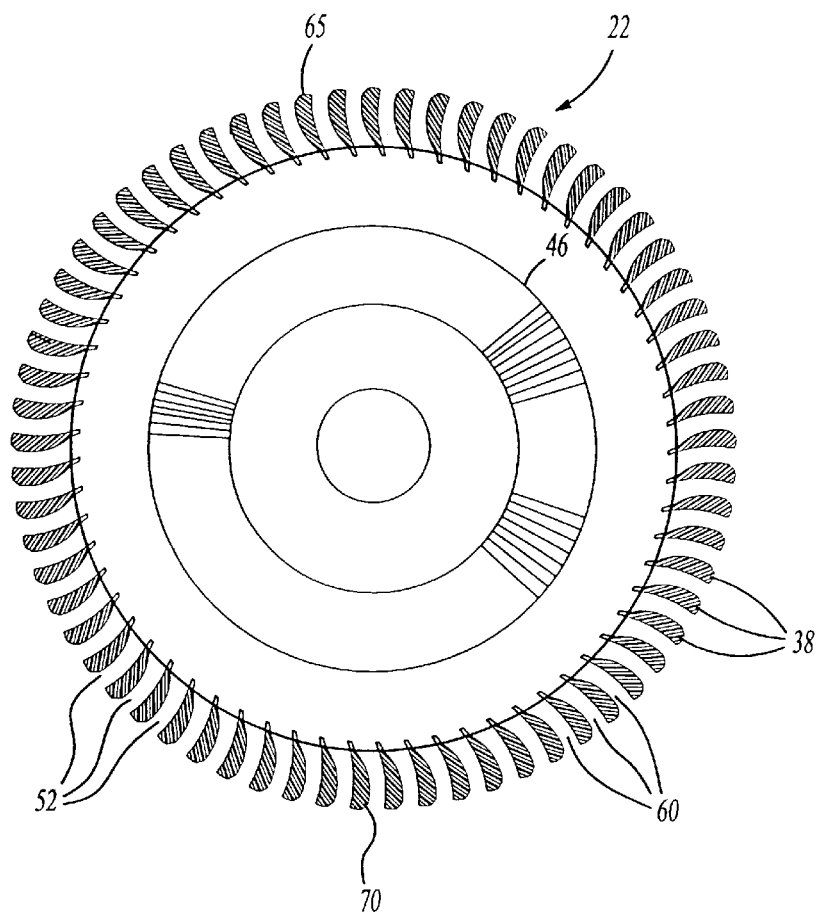
FIG. 6 is a cross-section along lines 6—6 of FIG. 3.

The longitudinally extending vanes 38 are curved about longitudinal axes 58 that extend between the upper lip 44 and the bottom 46 for each vane 38. The configuration allows the vanes 38 to have a nested relationship relative to each other as shown in FIG. 6. Preferably, each curved flow surface 60 has a similar radius of curvature such that proximal vanes are nested closely with respect to each other. This allows an increased number of vanes 38 to be positioned about the circumference of the separator 22. The curved flow surface, shown at 60 in FIG. 6, extending along the length of the vanes 38 in combination with the nesting increases airflow into the separator 22. Sharp edge effects normally created by traditional non-curved longitudinal vanes resulting in reduced airflow, are significantly decreased by using curved surfaces 60.

Figure 7:
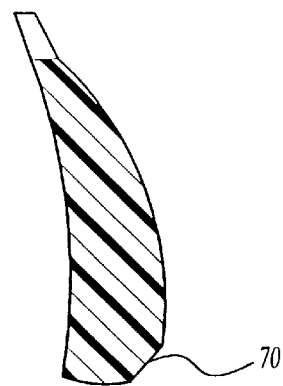
FIG. 7, is an enlarged cross-section of a single vane from FIG. 6.

Each vane has a chamfered edge 70 along the leading edge as shown in FIG. 6. The chamfered edges 70, see more clearly in the enlarged view of FIG. 7, help reject particulate entry into the separator before the particulates 40 can enter the slots 52. Thus, the flow generated near the outward portion of the vanes 38 as the separator 22 rotates impacts the chamfered edges 70 to increase particulate rejection.

Figure 5:
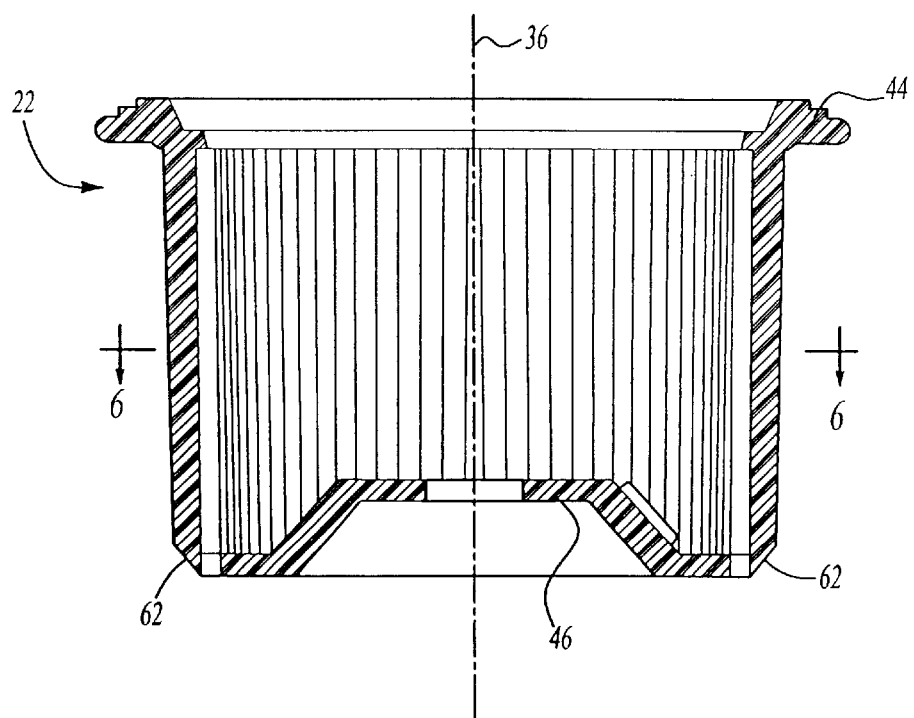
FIG. 5 is a cross section along lines 5—5 of FIG. 3.

Additionally, as shown in FIG. 5, the longitudinally extending vanes 38 include an angled or beveled bottom edge portion 62 that extends beyond the bottom portion 46. This beveled bottom edge 62 significantly reduces foaming that occurs due to the addition of cleaning chemicals or fragrances to the water bath 28. The beveled edge portions 62 on each of the vanes 38 reduces a propeller or churning effect created by rotation of the separator 22 and thus reduces foaming.

Thus, the method of separating particulates 40 from the air includes the following steps. Air with particulates 40 is drawn into a vacuum cleaner housing 12. The air and particulates 40 are drawn into the water bath 28 to filter out a first portion of the particulates 40. The air and remaining particulates 40 drawn to the outer surface of the separator 22. The vast majority of the remaining particulates 40 are separated from the fluid droplets and air by the longitudinally extending vanes 38. The curved surface 60 increases airflow into the separator 22 and significantly improves separation. Particulates 40 within the separator 22 can be trapped or retained within the separator 22 by secondary particle impacting vanes 42 that are formed within the bottom 46 of the separator 22.

As discussed above, the subject separator assembly 22 has significantly improved separation of small particulate sizes. The secondary particle impacting vanes 42 trap particulates 40 that enter the interior of the separator body 34. The curved longitudinal vanes 38 result in increased airflow into the separator 22 due to lower aerodynamic losses. With the longitudinal vanes 38 extending below the bottom portion 46, foaming is decreased. In addition, the nesting relationship of the longitudinal vanes 38 allows more vanes 38 to be included in the separator 22 such that the probability of particulate impact is increased.

The invention has been described in an illustrative manner, and it is to be understood that the terminology, which has been used, is intended to be in the nature of words of description rather than of limitation.

Modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A vacuum cleaner apparatus comprising:
  a housing;
  a motor disposed within said housing and having an output shaft;
  a fan coupled to said output shaft for generating a vacuum airflow through an air intake port in said housing; and
  a separator operably coupled to said output shaft for separating dust and dirt particulates entrained in air ingested through said intake port, said separator having a body that defines a longitudinal axis of rotation, said motor driving said separator to rotate about said axis, said body including a plurality of longitudinally extending vanes having a curved flow surface for increased particulate separation as said body rotates about said axis of rotation.

2. An apparatus as set forth in claim 1 wherein said curved flow surface increases airflow into said separator by presenting a side surface defined by at least one arc extending along the length of each of said vanes.

3. An apparatus as set forth in claim 2 wherein said longitudinally extending vanes are angled with respect to said axis of rotation.

4. An apparatus as set forth in claim 2 wherein said longitudinally extending vanes include a beveled bottom edge portion.

5. An apparatus as set forth in claim 4 wherein the body includes a bottom portion and said beveled bottom edge portion extends downwardly beyond said bottom portion.

6. A vacuum cleaner apparatus comprising:
  a housing;
  a motor disposed within said housing and having an output shaft;
  a fan coupled to said output shaft for generating a vacuum airflow through an air intake port in said housing; and
  a separator operably coupled to said output shaft for separating dust and dirt particulates entrained in air ingested through said intake port, said separator having a body that defines a longitudinal axis of rotation, said motor driving said separator to rotate about said axis;
  said body including an upper lip and a bottom portion interconnected by a plurality of longitudinally extending vanes and including a plurality of secondary particle impacting vanes formed within said bottom portion and anti-foaming means integrated with the longitudinally extending vanes.

7. An apparatus as set forth in claim 6 wherein the anti-foaming means includes a beveled bottom edge portion.

8. An apparatus as set forth in claim 6 wherein said longitudinally extending vanes each have a first end connected to said lip and a second end connected to said bottom portion to form a cup-shaped separator wherein said first end is positioned above said second end within a vertical plane that incorporates said vane and said longitudinal axis of rotation, said first and second ends being interconnected by a curved flow surface for increased particulate separation as said body rotates about said axis.

9. An apparatus as set forth in claim 8 wherein said secondary particle impacting vanes are positioned about the circumference of said bottom portion.

10. An apparatus as set forth in claim 8 wherein said secondary particle impacting vanes extend upwardly from said bottom portion toward said lip.

11. A body for a separator assembly as used in a vacuum cleaner apparatus for separating particulates from fluid ingested into the separator, the separator including an annular housing having an open upper end defined by an upper lip, a bottom portion, the body extending between the lip and bottom portion, the housing operable to rotate about a longitudinal axis of rotation, the body comprising a plurality of longitudinally extending vanes spaced apart from one another about a circumference of the body. to define an intake, each of said vanes having a first end connected to said upper lip and a second end connected to said bottom portion wherein said first end is positioned above said second end within a vertical plane that incorporates said vane and said longitudinal axis of rotation, said first and second ends being interconnected by an angled flow surface for increased particulate separation as said body rotates about said axis of rotation.

12. An assembly as set forth in claim 11 wherein said curved flow surface is defined by an arc that curves about an axis extending between said lip and said bottom portion.

13. An assembly as set forth in claim 12 wherein said curved surface extends along the length of said vanes with each curved surface having a similar radius of curvature such that proximal vanes are nested with respect to each other.

14. An assembly as set forth in claim 12 wherein said vanes are angled with respect to said axis of rotation.

15. An assembly as set forth in claim 14 wherein said lip extends transversely with respect to said axis of rotation.

16. An assembly as set forth in claim 14 wherein said vanes are spaced apart from one another to define a plurality of gaps between vanes, said gaps defining said intake.

17. An assembly as set forth in claim 12 including anti-foaming means integrated within said annular housing.

18. An assembly as set forth in claim 17 wherein said anti-foaming means is formed along a bottom edge of each of said vanes with said bottom edge extending downwardly at a greater vertical distance from said lip than said bottom portion.

19. An assembly as set forth in claim 11 including a plurality of secondary particle impacting vanes formed within said bottom portion for trapping particulates within said housing.

20. An assembly as set forth in claim 19 wherein said secondary particle impacting vanes extend out radially from said axis of rotation.

21. An assembly as set forth in claim 20 wherein said secondary particle impacting vanes include a curved flow surface.

* * * * *